United States Patent
Alonso Y Caloca (10) Patent No.: US 11,785,144 B2
(45) Date of Patent: Oct. 10, 2023

(54) METHODS FOR HANDLING VOICE AND DATA TELESERVICES THROUGH MOBILE DEVICES WITH ASYNCHRONOUS COMMUNICATION

(71) Applicant: Aurelio Luis Miguel Alonso Y Caloca, Mexico City (MX)

(72) Inventor: Aurelio Luis Miguel Alonso Y Caloca, Mexico City (MX)

(73) Assignee: Aurelio Luis Miguel Alonso Y Caloca, Mexico City (MX)

(*) Notice: Subject to any disclaimer, the term of this patent is extended or adjusted under 35 U.S.C. 154(b) by 0 days.

(21) Appl. No.: 17/362,221

(22) Filed: Jun. 29, 2021

(65) Prior Publication Data

US 2021/0329129 A1 Oct. 21, 2021

Related U.S. Application Data

(63) Continuation-in-part of application No. 16/352,166, filed on Mar. 13, 2019, now Pat. No. 11,082,562.
(Continued)

(51) Int. Cl.
*H04M 3/523* (2006.01)
*H04M 3/51* (2006.01)

(52) U.S. Cl.
CPC ....... *H04M 3/5237* (2013.01); *H04M 3/5125* (2013.01); *H04M 3/5175* (2013.01); *H04M 3/5183* (2013.01)

(58) Field of Classification Search
CPC ............. H04M 3/5183; H04M 3/5175; H04M 3/5237; H04M 3/5232
(Continued)

(56) References Cited

U.S. PATENT DOCUMENTS

| 6,771,765 B1 | 8/2004 | Crowther |
| 7,092,509 B1 | 8/2006 | Mears et al. |

(Continued)

FOREIGN PATENT DOCUMENTS

WO 2006037836 4/2006

*Primary Examiner* — Ahmad F. Matar
*Assistant Examiner* — Jirapon Tulop
(74) *Attorney, Agent, or Firm* — Dinsmore & Shohl LLP; Sean Mellino (57) ABSTRACT

A method for handling contact center teleservices in voice and/or data through a plurality of mobile devices, such as smartphones, is disclosed. The invention is directed to a novel concept named "Event" in which any interaction between a customer and a call center platform via voice or data is uniquely identified. This concept introduces a functionality into the Cloud-Implemented Intelligent ACD making it able to identify each call or contact with a "tag" that is later used to manage all possible future interactions between the customers and the agents by linking them under the Agent Mobile Platform, while adding the capability to maintain open the communication originally established between a customer and an agent in the case of any communication interruption, either involuntary or voluntary, thus making the C-I IACD able to route the contact once the communication is reestablished or when the customer calls the contact center platform back again. This method enables the customer to be attended by one and the same agent for as many times as the business rules permit, until the customer closes the opened tag.

8 Claims, 3 Drawing Sheets

Related U.S. Application Data (60) Provisional application No. 62/664,481, filed on Apr. 30, 2018.

(58) Field of Classification Search
USPC .................................................. 379/265.09
See application file for complete search history.

(56) References Cited

U.S. PATENT DOCUMENTS

| | | |
|---|---|---|
| 7,269,253 B1 | 9/2007 | Wu |
| 8,009,822 B1 * | 8/2011 | Boutcher ............ H04M 3/5232 |
| | | 379/265.11 |
| 8,108,237 B2 | 1/2012 | Bourne |
| 8,649,491 B1 * | 2/2014 | Boutcher ............ H04M 3/5235 |
| | | 379/265.09 |
| 8,767,948 B1 | 7/2014 | Riahi |
| 9,137,368 B2 | 9/2015 | Jasper |
| 10,165,109 B1 | 12/2018 | Custance |
| 2009/0168990 A1 | 7/2009 | Makagon |
| 2011/0225506 A1 * | 9/2011 | Casalaina ......... G06F 16/24575 |
| | | 715/744 |
| 2014/0177818 A1 * | 6/2014 | Chang ................. H04M 3/5183 |
| | | 379/265.09 |
| 2014/0307865 A1 * | 10/2014 | Tietsch ............... H04M 3/5231 |
| | | 379/265.11 |
| 2014/0376708 A1 | 12/2014 | Deryugin |
| 2015/0281445 A1 | 10/2015 | Kumar |
| 2017/0126893 A1 | 5/2017 | Boutcher |
| 2018/0131811 A1 * | 5/2018 | Buehler ............. H04M 3/5233 |

\* cited by examiner

METHODS FOR HANDLING VOICE AND DATA TELESERVICES THROUGH MOBILE DEVICES WITH ASYNCHRONOUS COMMUNICATION

REFERENCE TO OTHER CROSS-RELATED APPLICATIONS

This application is a Continuation-In-Part of and claims the benefit of U.S. non-provisional application Ser. No. 16/352,166 filed on Mar. 13, 2019, which claims the benefit of U.S. provisional application No. 62/664,481 filed on Apr. 30, 2018, the contents of which are incorporated herein by reference.

FIELD OF THE INVENTION

The invention relates to methods for handling teleservices in voice and data through a plurality of mobile devices such as smartphones by controlling communication asynchrony. More particularly, the invention relates to methods for assigning event tags during an asynchronous contact between a customer and an agent communicating with each other via voice or data when the communication is interrupted by any cause.

The invention also relates to a contact center system including a Cloud-Implemented Private Branch Exchange (C-I PBX) configured to assign and monitor event tags by means of a Cloud-Implemented intelligent Automatic Call Distributor (C-I IACD) during an asynchronous contact between a customer and a contact center agent.

BACKGROUND

For more than half a century, typical contact center platforms have used a device called Automatic Call Distributor (ACD) for routing incoming or inbound calls from a Private Branch Exchange (PBX) to agent's workstations by following a queuing method named First-In-First-Out (FIFO). A typical ACD acts as a queuing system for incoming or inbound calls (i.e. calls that are initiated by customers). Then, taking into account of the plurality of agents that are registered as available in the contact center, in particular the one or more agents that are not attending calls at that certain moment, and the FIFO criterion, the ACD typically transfers the inbound call to one of the plurality of agents having the longest wait time.

This way of managing inbound traffic is based on efficiency criteria to attend customer calls, which gives origin to the so-called "available agent staffing" that includes the plurality of agents logged-in and available in the call center platform. In particular, depending on the amount of customer's abandoned or hung up calls, the ACD generates reports that help to estimate the number of agents that are required in the contact center platform to attend to the maximum number of customer incoming calls. The aforementioned "available agent staffing" is commonly estimated by means of software called WorkForce Management (WFM). To minimize the number of customer calls unattended, and depending on the intra-day traffic curves registered by the ACD for a determined period, WFM contributes to the efficiency by managing the number of available agents through time intervals according to the incoming call traffic to also minimize the number of abandoned calls.

Nowadays, the basic FIFO criterion used by ACDs has been enriched with quality parameters such as, for example, agents' performance, particular skills and specialty degree. To this end, a device called Interactive Voice Response (IVR) may differentiate the agents by the type of service giving rise to different call queues that the ACD manages. By doing this management of criteria, the ACD can generate a better match between the calling customer and the agent's capabilities and skills, thus aiming to an improved customer service experience.

On the other hand, for outbound calls, which are calls initiated by agents to reach customers, a device known as Predictive or Progressive Dialer (PD) also uses the FIFO criterion to assign records from the databases of customers to be contacted during the operation schedule. Using additional variables related to the effectiveness of the contact with a customer such as the profiles of the customers matched with the quality variables that qualify the agents, for the assignment of each record. Which as with inbound calls, they aim at better service. Given the objective of contact efficiency that favors outbound calls, the sizing of agents, in this case, follows a curve of schedules taking into consideration the highest probability of customer contact; instead of following the volume of call traffic as shown in the case of inbound contacts through the ACD.

As previously disclosed in the non-provisional application Ser. No. 16/352,166 and in the provisional application No. 62/664,481 the functionalities of a typical (fixed) workstation are now transferred to a mobile device; the development of the present invention now allows the first FIFO queuing criterion of a typical ACD by using the Intelligent ACD to be enriched by a second criteria of proximity between an agent with a customer. That previous invention also incorporates the mobile devices' GPS module to enrich the basic FIFO criteria for assigning calls to agents by using the latter as a second criterion to consider; that is the proximity between the agent's physical location and the customer, thus leaving subsequent criteria related to quality that typical ACDs use today according to specific business standards.

The aforementioned techniques for managing inbound and outbound voice calls are also used for managing inbound and outbound contacts via data channels. The contact centers that are able to manage both voice and data channels are known as multichannel contact center platforms; they thus follow the same criteria of efficiency in optimizing human resources and minimizing call abandonment levels (in the case of inbound contacts) and efficacy in the maximization of contact levels with customers (in the case of outbound contacts).

As it is known by those skilled in the art, data channels in contact centers have considerable advantages over voice channels, one of which is an asynchronous characteristic related to the communication between a customer and an agent. In contrast to data channel, voice channel in a contact center requires for an agent and a customer to be mutually available and time coincident to communicate with each other at a required moment. Thus, synchrony must exist between an agent and a customer in a voice-based contact. This synchrony requirement is not mandatory for data contacts between customers and agents. In addition, the asynchrony characteristic of customer-agent contacts through data channels allows agents to serve more than one customer simultaneously. This simultaneous attention feature is not possible in voice channels due to the synchrony restrictions currently prevailing in managing the voice channel by the current contact center platforms. Accordingly, the productivity level in terms of the number of transactions attended by agents through data channels is usually higher as compared to voice channels because of the asynchronous feature of data-based contacts.

As previously disclosed in the non-provisional application Ser. No. 16/352,166 and in the provisional application No. 62/664,481, the multichannel service allows an agent, through the Cloud-Implemented Intelligent ACD, to attend customers in both voice or data channels or at variable time intervals during customer service hours, depending on the multichannel traffic observed on an intra-day. Also, the previous functionality of multichannel simultaneity in the available agents gives an advantage over the common multichannel contact center technology platforms. The latter usually have different skills for handling contacts through the voice channels and the data channels in such a way that they do not mix the traffic of voice and data in their staffing sizing.

Notwithstanding the above, it is well known in the field of contact centers that during the contact between a customer and an agent certain circumstances may occur that cause the contact to get interrupted. For example, a customer calling via voice channel through mobile phone to an agent may lose the call because of a weak signal or because the customer needs to attend to other matters. If the service required by the customer was not completed during the voice call the customer will have to initiate another voice call which, according to the current criteria of the typical contact center mentioned above (FIFO and quality parameters), will be attended by another agent, specifically the first queued agent having the longest waiting time as an available agent. This circumstance is intrinsically related to the synchronous nature of inbound voice calls related to contact centers.

The foregoing establishes an issue in the management of contact center platforms because a customer that needs assistance from a contact center agent and that suffers from one or more interruptions during the call, whatever the cause and irrespective of the channel (voice or data), is required to call again to the contact center every time the contact is interrupted. What is worst under these circumstances is that every inbound call will be attended by a different agent until the customer satisfies his needs, thereby frequently causing the customer to restart the whole process of, for example, providing customer information, data verification, explanation of the problem, etc. Resuming the contact with the same agent, and ideally the first agent reached by the customer, is not possible with the current architecture and ACD functionalities of typical contact centers. This drawback inevitably impacts the customer satisfaction negatively; and it gets even worst when the customer requires urgent assistance.

To date, providing the possibility for one and the same agent to solve the customer's needs in both inbound and outbound contacts under asynchronous communication has not been considered let alone solved. Further, in cases when the contact center's business rules require two or more contacts between the customer and the agent to conclude an ongoing case, it is typical for customers to be attended by different agents, which is detrimental to customer satisfaction metrics.

Despite the technological advances in the elements, devices and systems of contact centers, to date, nobody has explored or addressed the unlimited capacities of mobile devices to enable mobility of the functionalities of a contact center, i.e. voice and data teleservices, in particular to enable mobility of workstations also enriched with the capability to interrupt a communication and automatically reestablish it from the customer at any future time with the same agent that was in conversation before the interruption, with the possibility of continuing the communication from the point that it was interrupted. This enriches the contact center functionalities with the full advantages of communication asynchrony in multichannel platforms incorporating a tagging method into the functionalities of the Cloud-Implemented Intelligent ACD considered as a part of the previous invention.

The foregoing means that the criteria for resolving cases opened for the attention of customers are not considered under the prevailing logic of efficiency and productivity, which are rules currently followed by current contact center platforms' management.

It is desirable to provide the so-called "One-2-One" attention to customers that require assistance from one and the same contact center agent irrespective of the channel, i.e. voice or data, even during asynchronous communication, thus giving advantages in metrics related to case resolution and customer satisfaction.

SUMMARY

Accordingly, certain aspects of the invention related to a method for establishing communication via voice or data between a customer and an agent including the automatic reestablishment of the contact between the customer and the agent following a communication interruption.

Furthermore, certain aspects of the invention relate to a method for handling availability asynchrony between a cloud-implemented contact center and an agent mobile platform in both inbound and outbound contacts through a cloud-implemented Intelligent Automatic Call Distributor (C-I IACD), which integrates an ACD and a Progressive Dialer (PD) now enriched with the identification of the first contact from a customer with an agent to resolve a customer case, through tagging the first interaction in order to the subsequently communications over the same case will be attend by the same agent, which give the characteristic of asynchrony for the voice communication channel and also to the data channel with this improvement of the C-I IACD.

Further, certain aspects of the invention contemplate integrating the FIFO queuing criterion of the cloud-implemented C-I IACD with geolocation of an agent's mobile device, now enriched with the new feature of identify the agent in charge of resolve the case of attention for a customer that had initiated the interaction until the case is concluded by the customer.

BRIEF DESCRIPTION OF THE DRAWINGS

The appended drawings are used to illustrate schematically certain non-limiting aspects of the invention. The aforementioned features and advantages and others will become apparent to those skilled in the art and the invention will be better understood from the reading of the following detailed description with reference to the appended drawings. The drawings denote like elements with like reference numbers unless otherwise indicated, in which.

DETAILED DESCRIPTION OF EMBODIMENTS OF THE INVENTION

In the sense of the present invention, the terms "agent mobile platform", "mobile platform" or "platform" are used interchangeably unless otherwise indicated and refer to a combination of a mobile device, such as a smartphone, an application (commonly known by its abbreviated form "app") installed and running on the mobile device.

Similarly, the terms "contact center system", "contact center," and "system" are used interchangeably hereinafter and refer to a system for handling voice and data teleservices of a contact center in accordance with aspects of the invention.

Figure 1:
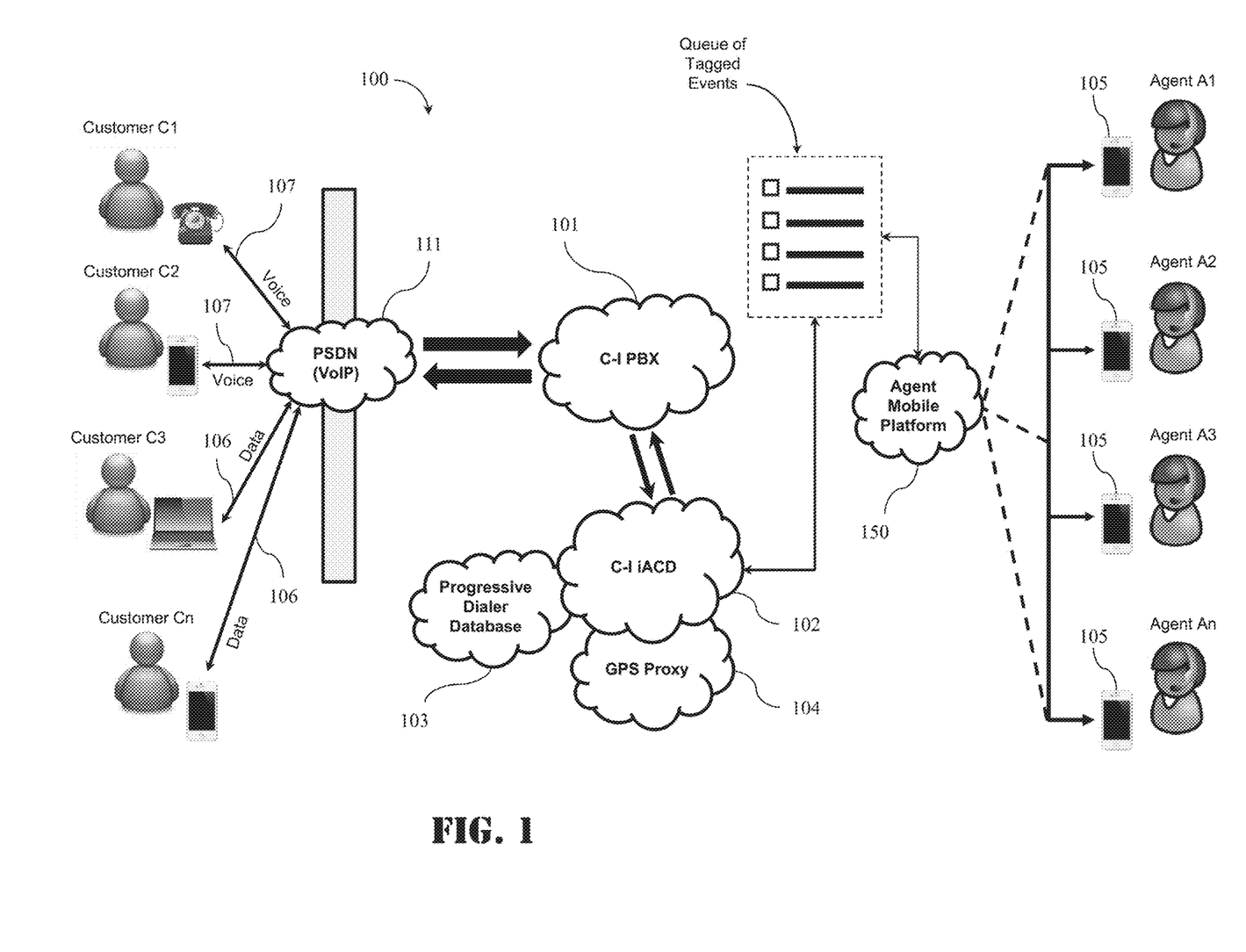
FIG. 1 schematically shows components of a contact center system configured to route inbound and outbound calls or contacts from a plurality of customers via voice and data to and from agent mobile platforms according to certain embodiments of the invention.

Reference is now made to FIG. 1 that schematically shows components of a contact center system 100 configured to manage inbound and outbound contacts between a plurality of customers (C1-Cn) and a plurality of agents (A1-An) via voice (107) and data (106) channels through an agent mobile platform 150 according to certain embodiments of the invention.

The Contact Center System in cloud 100 includes a Cloud-Implemented Private Branch Exchange (C-I PBX) 101, a Cloud-Implemented Intelligent ACD (C-I IACD) 102 that integrates or communicates with a Progressive Dialer 103 and that communicates with an Agent Mobile Platform 150 for assigning communications between customers (C1-Cn) and agents (A1-An). The C-I PBX 105 is configured to communicate with customers (C1-Cn) via Internet through the Public Switched Data Network (PSDN) 111. The PSDN 111 normally manages indistinctly voice and data under different protocols including Voice over Internet Protocol (VoIP), which is particularly used by the Contact Center System in Cloud 100.

The Contact Center System in Cloud 100 enables the interaction between users of products or services (i.e. customers C1-Cn) with one of a plurality of agents (A1-An) via voice or data taking account of the agents' location due to the intrinsic characteristics of mobile devices having geolocation features, which are typically provided by a GPS module, and are now enriched with a third criteria related to the identification of a TAG that is assigned by the C-I IACD at the first contact between a customer and an agent, in such a way that the customer is attended in subsequent communication(s) by the same agent, even with asynchronous communication, until the conclusion of an "attention case" required by the customer. To accomplish this goal, the agent only requires a mobile device, such as a smartphone, and connection to the Internet for interacting, by means of the Agent Mobile Platform 150, with the Contact Center System 100.

The Agent Mobile Platform 150 is configured to enable an agent (A1-An), via a mobile device (105), such as a smartphone, to handle interaction initiated either by a customer (C1-Cn) or an agent (A1-An) through voice 107 (e.g. a typical phone call) or data 106 (e.g. a chat or webpage). The contact center system 100 is able to route and manage the contact between an initial customer (C1-Cn) and one of a plurality of agents (A1-An) that is geographically closer to that customer (C1-Cn) irrespective of the channel (voice 107 or data 106). However, in the cases where the contact is interrupted by any reason or circumstance, the customer would be required to initiate a second contact. Said second contact, according to former teachings, would cause the contact center system to assign a new agent to attend the initial customer.

To solve the drawbacks related to the synchronous communication discussed above, certain aspects of the invention provide a Contact Center System in Cloud and related method for handling teleservices in voice and data via mobile devices by controlling asynchrony communication.

The plurality of agents (A1-An) is interconnected with the C-I IACD 102 through the Agent Mobile Platform 150. The Contact Center System 100 is configured to route voice-based contacts (107) and data-based contacts (106) to the C-I IACD 102, and by means of the Agent Mobile Platform 150, to route them to the available agents (A1-An) by taking account of the FIFO criterion and the agent's geolocation that is closest to each customer (C1-Cn) in either channel (voice 207 or data 206). Advantageously, each contact event is generated including a TAG. Moreover, the Contact Center System 100 is configured in such a way that said TAG is considered as "open" as long as the customer deems his needs are still unsatisfied; conversely, the TAG is considered as "closed" or "finished" when the customer deems his needs are satisfied. To this end, the Contact Center System 100 requires for the agent and/or the customer to make an action that closes or finishes an open tag. For instance, the action to close or finish an open TAG can be, for example, without limitation, pressing or tapping the key "#" of the telephone's dialer. In addition, the Contact Center System 100 is configured to generate a list or queue of events including open TAG events (i.e. events that have been already generated) and new TAG events, so as to prioritize the routing of contacts related to open TAG events to the agents that were previously assigned when the events where first generated over the new TAG events.

The C-I IACD 102 is further configured to identify whether each contact interaction is inbound or outbound communication for both voice and data channels. This is achieved by assigning a TAG to each EVENT that is generated by all customer-agent contacts, which contacts are necessary to complete a successful business interaction called "attention case" herein. In other words, find the resolution of an "attention case" that the customer requires.

In the first contact with which a customer initiates an "attention case" contacting the Contact Center System 100 to ask for assistance, the customer is assigned to the agent that first attends the interaction. The C-I IACD 102 then identifies said interaction with a specific agent (C1-Cn) by assigning the aforementioned TAG. In this way, subsequent contacts initiated by the same customer can be routed to the same agent that attended the case from the beginning even if a communication interruption happened during the first contact. Any TAG associated to an interrupted communication is classified as an "open TAG" by the C-I IACD 102 until the closing of the "attention case" by the customer. Said closing of the "attention case" is verified through business rules that allow the use of "keywords" or "alphanumeric keys". Said business rules are given to the customer during the attention of his/her case, so as to be employed when the connection between agent and customer is concluded.

The above means that the C-I IACD 102 assigns a call to an agent using the typical FIFO as the first criterion. A second criterion is the proximity of the agent to the customer. The improvement now consists in adding a third criterion, specifically the aforementioned TAG that links each interrupted communication with one and the same agent until the TAG is closed. This third criterion guarantees that a customer who has not concluded his "attention case"

is attended by the one and the same agent until resolution of the customer's needs. This entails a resolution criterion in the management of calls or contacts that ensures the multichannel attention given to customers is prioritized even during communication interruptions. This aspect is called "One-2-One" resolution of cases.

In addition, the present invention introduces the concept of EVENT. With this aspect of the invention, the Contact Center System 100 is able to manage the different customer contacts to solve an "attention case", which is also documented like the interaction itself, while avoiding being registered as a different call or an independent or new contact. This aspect of the invention ultimately causes an "attention case" to be attended or resolved not by different agents but one and the same initial agent who was assigned the "attention case" in the first contact of a customer with a resolution purpose.

FIG. 1 shows elements of a Contact Center System in Cloud 100 with which an agent receives an event, i.e. a customer interaction, from a C-I IACD 102 that is configured to identify the event of communication with a TAG, using previous business rules to validate and route calls to the respective available agent under FIFO criteria and then identify the agent physically closer to the customer to assign the contact under the TAG identification to the agent selected.

The aforementioned function is originated when an agent login the Agent Mobile Platform 150 reporting to the C-I IACD 102 his availability to receive interactions, together with the Private Branch Exchange (PBX) 105 and at the moment that a customer's call enters, the C-I PBX 105 transmits the call to the C-I IACD 102 to be routed to the Agent Mobile Platform 150 via Internet and automatically the C-I IACD assigns a TAG as an identification of the EVENT. This provides the functionality that, in case of any communication interruption, when the agent or the customer recalls the interaction they continue working over the same EVENT until the customer, under business rules, finishes the TAG.

Figure 2:
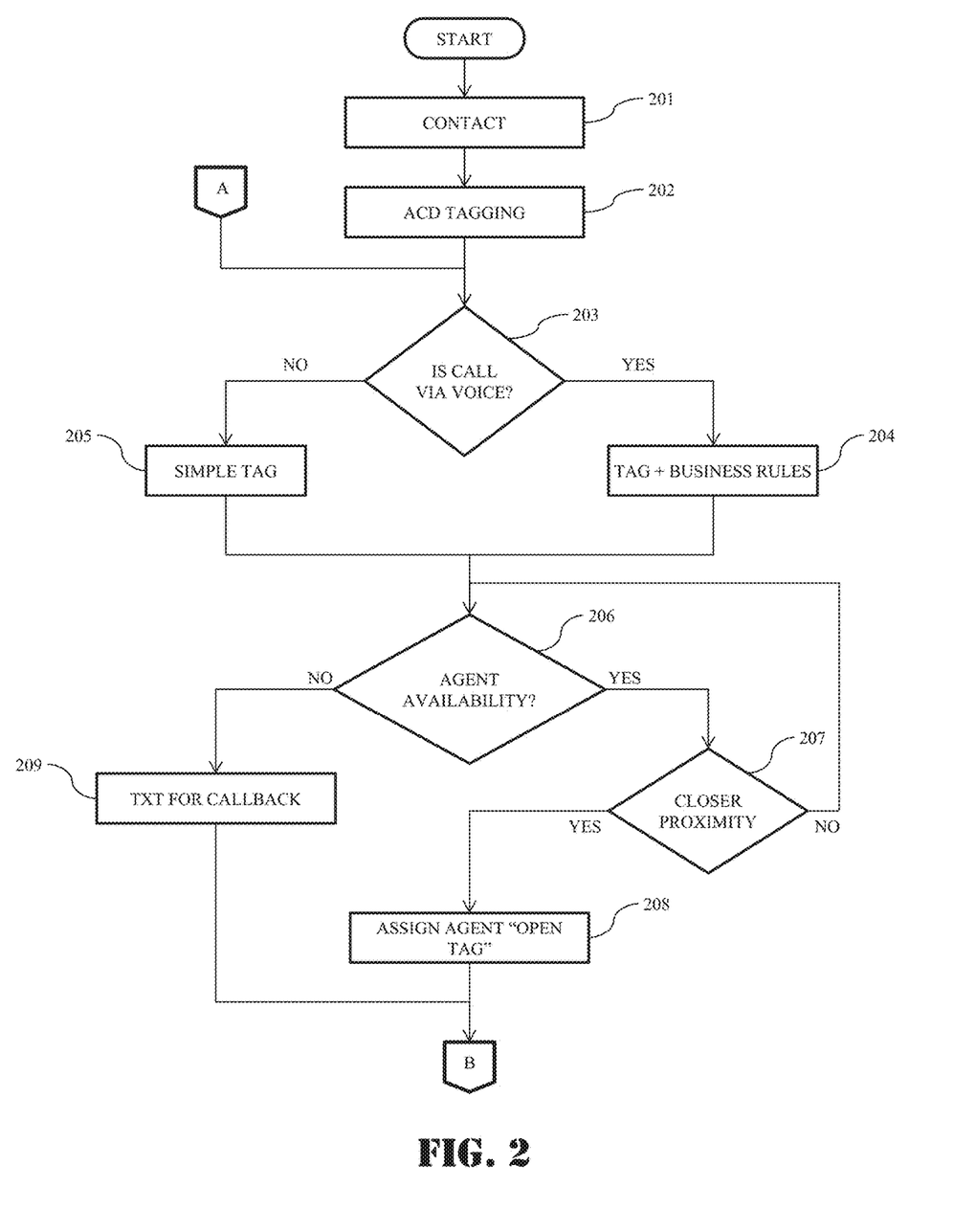
FIG. 2 shows a flowchart of a method for managing inbound and outbound contacts by tagging of events according to certain aspects of the present invention.
Figure 3:
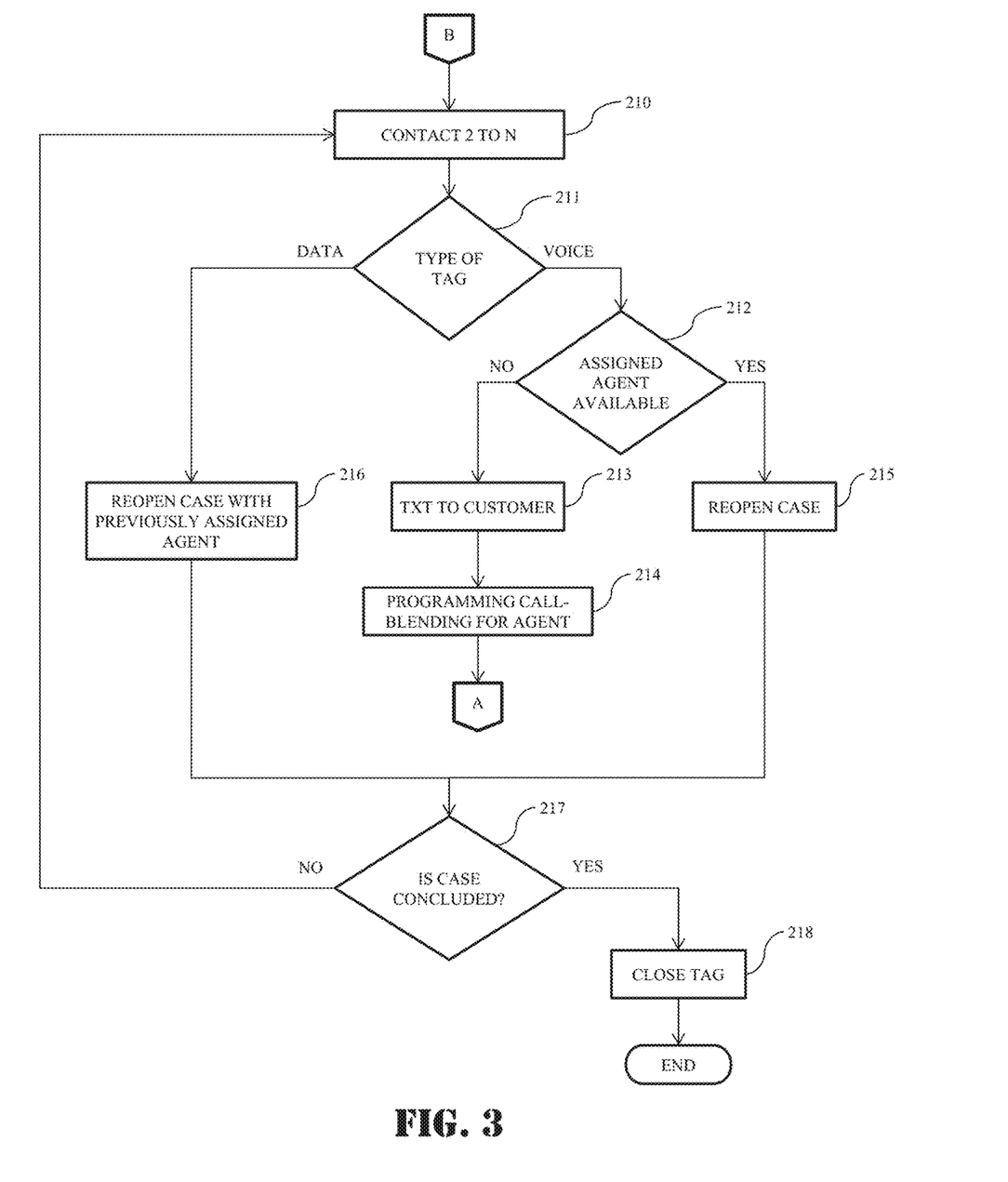
FIG. 3 shows a flowchart of a method for managing asynchronous communication between an agent and a customer having assigned a tag event between them.

Reference is now made to FIG. 2 that shows a flowchart of a method for managing inbound and outbound contacts by tagging (or generating tags of) events according to certain aspects of the present invention. The method starts at step 201 when either a customer initiates a contact with an agent (inbound) or an agent initiates a contact with a customer (outbound). When the contact between agent and customer is established, the C-I IACD establishes an EVENT and also a TAG associated to it (step 202). Next, the C-I IACD determines whether or not the contact is carried over voice. In the affirmative, the C-I IACD manages the contact by considering the TAG and business rules (step 204). In the negative, the C-I IACD manages the contact with a "simple" TAG (step 205). As a result of either step 204 or 205, the method advances to determining whether or not the agent available (step 206). In the negative, the C-I IACD causes the contact center system to send a message or notification inviting to call back again later (step 209). In the affirmative, the method advances to determining whether the agent is the one closest to the customer (step 207).

When the agent is not the one closest to the customer, the method returns to step 206 to determine availability of another agent. Conversely, when the agent is the one closest to the customer, the TAG can be established, for example, as OPEN (step 208). This OPEN TAG generated for the EVENT will remain as OPEN even if one or more connection interruptions occur. The method now moves to the next stage that is shown in FIG. 3, described in further detail below.

When there are two or more contacts between the customer and the agent (step 210), the method advances to determine, by means of the C-I IACD, the type of TAG in terms of data communication or voice communication (step 211). When it is data, the method advances to step 216, in which the C-I IACD reopens the case by identifying the OPEN TAG of the event. When it is voice, the method advances to determine whether there is an available agent (step 212). In the affirmative, the C-I IACD reopens the case (step 215). In the negative, the C-I IACD sends a message to the customer (step 213) and then it programs a call-blending for agent (step 214). Next, the method moves back to step 203 (FIG. 2).

The TAG for identifying the call or contact that gives origin to the "attention case" is assigned to one and the same agent. This agent will continue to provide attention to all consequent calls or contacts until the customer considers the case is completed because of the management done by the C-I IACD 102. This method, which starts with the concept of an EVENT instead of a call or contact (for the attention of interactions with customers), prioritizes the resolution criterion in the contact center platforms' management and guarantees the "One-2-One" resolution practice for customer services.

Additionally, the assignment of customer-agent interactions through the use of the TAGs to identify EVENTS, adds an asynchrony characteristic to communication via the voice channel, which is currently unusual in this channel.

The aforementioned functionality allows the customer to continue the tracking of his "attention case" at a later time when a contact interruption occurs for any reason, whether the interruption is related to the communication signal, the coverage of the PSDN 111, or by customer's action (e.g. the customer hung up either voluntarily or accidentally). From the moment in which the typical synchrony required in voice communication with the agent was discontinued, the customer will be able to continue his/her "attention case" with the same agent using the asynchrony communication characteristic that the present invention adds to the Contact Center System in Cloud disclosed in the non-provisional application Ser. No. 16/352,166 and in the provisional application No. 62/664,481. With the development of the present invention, one and the same agent will continue with the resolution of the customer's case, despite subsequent contacts, until the customer concludes the case. This method of dealing with the multiple numbers of interactions that are required to resolve a customer's "attention case" under the concept of EVENT means providing the novelty of asynchrony characteristic to the communication in the voice channel of the contact centers.

The way EVENT service operates through an "open TAG" of identifying from the first customer contact to the Contact Center System in Cloud is to link posterior calls or subsequent contacts of a customer with the same agent 101 via the agent Mobile Platform 150 according to the tagging functionality of the C-I IACD 102 of the Contact Center System in Cloud 100.

In the case that the "EVENT" is related with a contact or interaction via data i.e. webpage, chat or social media channels, when the C-I IACD 102, assigns the interaction, inbound or outbound, to an agent through the Agent Mobile Platform 150, the TAG which will identify the "EVENT" is open by default and managed for the original agent who catches the contact, until the TAG of communication is declared as concluded by the customer, it gives the contact center platform the capability to maintain the interaction "One-2-One" agent-customer, under the typical communication asynchrony that exists in these channels between a couple of persons in their day to day but in this case in a business to customer communication through a contact center instance.

There are three particular moments in the management of the interactions between customers and the Contact Center System y Cloud 100, which impact on the method followed by the C-I IACD 102, when an interaction occurs:

1) When a customer calls or connects for the first time to the Contact Center System in Cloud 100 through the PSDN 111 as depicted in FIG. 1, the C-I IACD 102, under the FIFO and customer-proximity, assigns an "attention case", to an agent by means of the agent Mobile Platform 150 by adding a TAG for identification from the origin of the EVENT as it is further described in FIG. 2.
2) When the agent is available at the time of re-calling or re-contact of the customer with open TAG, the C-I IACD 102 communicates directly to the agent previously assigned to the TAG and when contacting the customer, reopens the "attention case" in the mobile device screen, thus resuming the point where the previous communication went interrupted as it is further described in FIG. 3.
3) When an agent is busy attending a customer other than the one with the previous "open TAG", and at that moment the customer with whom he has the "open TAG" calls again, the C-I ACD 102 sends a text message to the agent with the assigned TAG alerting him of the recurring EVENT and in parallel, the C-I IACD 102 sends a text to the customer informing that the agent assigned to his "attention case" (EVENT), will communicate shortly and schedules an outbound call from the agent. Under the "call back" feature, i.e. when hanging up the call that is being answered, the C-I IACD automatically changes the agent to the outbound mode in preview dialing to recover the contact with the customer having the "open TAG".

The aforementioned method that follows in the added functionality utilizing the C-I IACD 102 according to the present invention for the assignment of the TAGs and how it manages them in the 3 moments of interconnection through the voice channel described above (first, when the agent with the "open TAG" is available, second when the agent is serving another customer, and third when the agent is re-contacted by a customer with "open TAG") is the same method used for data channel. In the case of the data channel, the treatment of TAGs and their management is indifferent to the voice channel since it is not necessary to differentiate the moments of available or in attendance of another customer of the agent with "open TAG", given the possibility of attending several customers at the same time allowing the asynchrony characteristic of communication via data. This avoids the transmission of automatic text messages to both, the customer and the agent by the C-I IACD, and simply at the moment of re-contacting the customer with "TAG open", the contact is opened for the agent at the point where the interaction or EVENT was previously left.

In practice, the number of "open TGs" managed by the C-I IACD 102 can be regulated through business rules that determine the period (hours or days) that an "open-case" or EVENT will remain in action according to a business process until its conclusion, as well as the capture of number of repeated interactions that a customer needed before concluding an EVENT or "open-case". The C-I IACD 102 can also keep track of the maximum number of "open TAGs" that can be attended by an agent to guarantee that the resolution objective and improvements in customer satisfaction since one specific agent is assigned for resolution derived from a "One-2-One" service remains in effect.

The aforementioned features, although they focused on the voice channel, which is typical in contact center platforms, is now enriched with the attribute of asynchrony in customer-agent communication with the development of the present invention. Such features can be applied for data channels making use of the same methodological concept of identification of an EVENT. In of the data channel, the methodology of assigning a TAG to each "attention case" of customers that establish a connection with the contact center system is applied more inherently given the nature of implicit asynchrony that communication through data channels presents; however, the present invention guarantees that the "attention case" is in charge of the same agent from the first contact to the final interaction in which the customer considers his case as concluded.

Thus, the value of the methodology under the concept of EVENT adds to the management of contacts of the C-I IACD 102 in data channels is that, through the method of assigning a single TAG for the different interactions related to the "attention case" of a customer, it guarantees that the same agent will attend the case, for as many contacts as the "attention case" requires to be successfully concluded, or until, as in the voice channel, the customer makes use of the business codes that are provided to every customer to label the "attention case" as concluded, thus "closing the TAG".

The use of this method identified as EVENT guarantees the "One-2-One" resolution practice through data channels that are usually attended by a plurality of agents in typical contact centers due to the prevailing efficiency criteria of typical ACDs.

Likewise, in the case of data channels, the temporality or validity of an "open TAG" may be indeterminate and it does not require business rules that determine its nature as an "open TAG" or the number of interactions per EVENT, which can also be indeterminate and the number of "open TAGs" that an agent can handle may be not limited. However, for issues related to business processes, if it is required to apply restrictions regarding the aforementioned variables of the temporality of the TAGs and volume of EVENTs that an agent can manage, business rules can be established in the same the way as the C-I IACD does for the voice channel.

The "EVENT" then represents a new way of treating the calls or contacts managed in the contact center system, which provides the capability of maintaining the communication for the agent that originally had got the contact from the customer in case of any sort of interruption such as, but not limited to, a failure in signal or a voluntary interruption thus preserving that communication by means of a tag that is assigned by the C-I IACD 102, which is configured to identify agents ready to attend calls, the call remains in standby until the signal is recovered and the communication is reestablished, or the interaction will then be automatically continued when the customer calls the contact center system back, ensuring he/she will be attended by the same agent that was contacted in the first place, if the call-back is verified during the period determined by the business rules. This functionality results in asynchrony communication in both inbound and outbound contacts via voice to the contact center system.

The foregoing represents an advance in the management of the interactions between a customer with a call center agent by using the benefits of natural asynchrony communication channels or media through the C-I IACD 102 enriched with the functionality of the TAGGING method for identifying each "EVENT", previous to transfer to an agent the contact of a customer through de Agent Mobile Platform 150, to achieve the characteristic of asynchrony communication over a contact center platform.

It is expected that during the life of any patents derived from this application many technological advances will be developed and the scope of the corresponding terms in the present description are intended to include all such new technologies a priori.

The terms "comprises," "comprising," "includes," "including," "having." and their conjugates mean "including but not limited to."

As used in the present specification, the singular forms "a," "an," and "the" include plural references unless the context clearly dictates otherwise.

It is to be understood that certain features of the invention described in the context of separate embodiments for clarity sake, may also be provided in combination with a single embodiment. Conversely, various features of the invention, which are described in the context of a single embodiment for brevity sake, may also be provided separately or in any suitable combination or as suitable in any other described embodiment of the invention.

Although the invention has been described in conjunction with some embodiments thereof, any modifications or variations to the same will be apparent to those skilled in the art. Accordingly, the present disclosure is intended to embrace all such modifications and variations that fall within the spirit and broad scope of the appended claims.

What is claimed is:

1. A method for managing voice and data communication asynchrony in an In-Cloud Contact Center System, comprising:
    obtaining, from a respective mobile device GPS module, an agent geolocation for a plurality of agents logged-in in the In-Cloud Contact Center System;
    obtaining, either from a customer caller identification (ID) or a mobile device GPS module, a customer geolocation;
    initiating a first communication contact between the customer and one agent the agent that is located closest to the customer based on the customer geolocation and the agent geolocation;
    generating, by means of a Cloud-Implemented Intelligent Automatic Caller Distributor (C-I IACD), an event from the first communication contact involving said customer and said agent;
    automatically generating, by means of the CI IACD, an association between said agent and said customer to the event as soon as the first communication contact is established;
    detecting, by means of the C-I IACD, a communication interruption in the first communication contact;
    automatically generating and assigning, by means of the C-I IACD, an open tag to the event based on the detection of the communication interruption in the first communication contact;
    automatically detecting that the communication interruption in the first communication contact is ended, whereby communication between said customer and said agent can be resumed;
    automatically using the generated open tag to establish subsequent communication contacts, following the communication interruption in the first communication contact, between said customer and the same agent assigned in the first communication contact.

2. The method according to claim 1, wherein automatically using the open tag further includes receiving an action from the customer and/or the agent to close the open tag.

3. The method according to claim 2, wherein the action includes pressing or tapping a key on a telephone's dialer or in a keyboard.

4. The method according to claim 1, further including automatically detecting whether said agent is available or busy at the time the subsequent communication contacts are established.

5. The method according to claim 4, wherein automatically detecting that the agent is available at the time the subsequent communication contacts are established further includes using the open tag.

6. The method according to claim 4, wherein automatically detecting that the agent is busy at the time at the time the subsequent communication contacts are established further includes automatically sending a text message to said agent and automatically sending a text to said customer.

7. An In-Cloud Contact Center System comprising:
    a Cloud-Implemented Intelligent Automatic Caller Distributor (C-I IACD) configured to:
        obtain, from a respective mobile device GPS module, an agent geolocation for a plurality of agents logged-in in the In-Cloud Contact Center System;
        obtain, either from a customer caller identification (ID) or a mobile device GPS module, a customer geolocation;
        initiate a first communication contact between the customer and the agent that is located closest to the customer based on the customer geolocation and the agent geolocation;
        generate an event from the first communication contact involving said customer and said agent,
        automatically generate an association between said agent and said customer to the event as soon as the first communication contact is established;
        detect a communication interruption in the first communication contact;
        automatically generate and assign an open tag to the event based on the detection of the communication interruption in the first communication contact;
        automatically detect that the communication interruption in the first communication contact is ended, whereby communication between said customer and said agent can be resumed;
        automatically use the generated open tag to establish subsequent communication contacts, following the communication interruption in the first communication contact, between said customer and the same agent assigned in the first communication contact.

8. The In-Cloud Contact Center System according to claim 7, wherein the C-I IACD is further configured to add First-In-First-Out (FIFO).

* * * * *